Patented Jan. 20, 1948

2,434,662

UNITED STATES PATENT OFFICE 2,434,662

POLYETHYLENE STABILIZED WITH BIS-(HYDROXYPHENYL) PROPANES

George H. Latham and Daniel E. Strain, Wilmington, Del., assignors to E. I. du Pont de Nemours & Company, Wilmington, Del., a corporation of Delaware No Drawing. Application February 3, 1944, Serial No. 520,954

5 Claims. (Cl. 260—94)

This invention relates to new compositions of matter and particularly to new compositions of matter comprising normally solid polymers from ethylene. This application is in part a continuation of our copending application S. N. 474,850 filed February 5, 1943.

In the practice of this invention any normally solid polymer of ethylene made either by the processes of U. S. Patents 2,153,553 or 2,188,465 or by contacting ethylene with water and a peroxy compound catalyst, preferably a diacyl peroxide or a dialkyl dioxide, at temperatures of from 40° to 350° C. and at pressures in excess of atmospheric, preferably in the range of 50 to 1500 atmospheres, can be used. The polymers of ethylene correspond in composition substantially to $(CH_2)_x$, have molecular weights in excess of 4000, and soften or melt between about 100° C. and about 120° C. and their melting point is substantially independent of their molecular weight.

On the basis of their known structure it would be expected that these ethylene polymers would show unusual stability to oxidative and other degradative agencies. It has been found, however, that when these ethylene polymers are exposed for prolonged periods to weathering agencies, light or heat in contact with air, they show severe degradation, as evidenced by loss in tensile strength, elongation, and tear resistance.

It is accordingly an object of this invention to provide compositions comprising ethylene polymers, including its interpolymers, which have improved stability. Another object is to provide compositions comprising ethylene polymers which in the form of self-supporting films, molded articles, fibers, or coatings have improved heat and light stability and improved durability upon outdoor exposure. Still another object is to provide new compositions comprising ethylene polymers and as a minor component a substituted phenol, a polyhydric phenol, an aryl amine, a long chain aliphatic amine, a heterocyclic compound containing annular nitrogen, or a polymeric amino nitrogen containing substance. Other objects will appear hereinafter.

The above objects are accomplished according to this invention by incorporating into a normally solid ethylene polymer a small amount of an agent such as a substituted phenol, a polyhydric phenol, in any suitable manner that will thoroughly distribute it throughout the polymer. This can be accomplished in any machine suitable for mixing solids, as by milling the ethylene polymer on heated rolls, such as are used in the compounding of rubber, or other suitable milling equipment, and adding agent thereto. Instead of adding the agent to the polymer in the solid or molten state it can be added to a solution or suspension of polymer in an organic solvent or to an aqueous dispersion thereof. The polymer containing the agent or the solution, emulsion, or dispersion of polymer containing added agent can be formed into any desired shape.

Through the use of the agents described herein it has been found that three kinds of stabilization can be brought about, namely, stabilization against heat-degradation, against light-degradation, and against degradation upon outdoor exposure.

In general, the amount of agent to be added to the ethylene polymer depends upon the agent used, and upon the degree and kind of stabilization desired. The amount of agent added can vary up to 50% on the weight of the ethylene polymer but as a rule it is preferred to use the minimum amount required to achieve the desired results. The amount commonly used will vary from 0.1 to 5 parts by weight per hundred parts ethylene polymer.

In one form of practicing the invention the ethylene polymer is dissolved in a hot organic hydrocarbon solvent, e. g., xylene, and to this solution is added the agent in amount sufficient to give 1% thereof on the polymer. These solutions are cast on steel plates, the thickness of the film is adjusted so as to give a dry film of about 1 mil in thickness, the solvent is removed by evaporation, and, after drying, the film is stripped from the plate.

The examples which follow illustrate the utility and the outstanding advantages of this invention.

*Example 1.*—A solution of a polymer of ethylene having an intrinsic viscosity of 0.55 (measured as a 0.125% solution in xylene at 85° C.) and a calculated molecular weight of about 9,200 was prepared by dissolving 10 parts of the polymer in 90 parts of hot xylene. To this solution was added a sufficient amount of the agents listed in Table I, to give 1% thereof, based on the polymer. These solutions were poured over steel plates and the film thicknesses adjusted so as to give a dry film of about 1 mil in thickness. After evaporation of the solvent the films were stripped from the plate and exposed to heat, light, and outdoor conditions. These films were tested for tear resistance both before and after various periods of exposure. Typical results are shown below:

Table I

| Stabilizer | Tear Resistance After fade-ometer exposure for— | | | |
|---|---|---|---|---|
| | Original | 500 hrs. | 1,000 hrs. | 1,500 hrs. |
| None | 57 | 64 | 23 | 11 |
| Bis(2-hydroxy-4,6-dimethyl phenyl) propyl methane | 57 | 63 | 33 | |

The fade-ometer in which the above exposures were obtained was operated at approximately 100° C. and 100% relative humidity.

*Example 2.*—A polymer of ethylene was prepared by contacting ethylene containing 60 parts per million of oxygen with water at a temperature of approximately 200° C. and at a pressure of 1,000 atmospheres. The polymer had a melt viscosity of 0.02. One batch of the polymer was untreated, a second milled with 2% phenyl-beta-naphthylamine, and a third with 2% of hydroquinone. Each batch was rolled into sheets of approximately 1 mil in thickness and placed in an oven maintained at 100° C. An atmosphere of air surrounded the products during the treatment. At the end of 4 weeks the products were removed from the oven, moldings prepared, and tensile and elongation measurements were made. Original and final values are given in Table II.

Table II

| | No Stabilizer | | 2% phenyl-beta naphthylamine | | 2% Hydroquinone | |
|---|---|---|---|---|---|---|
| | Orig. | 4 Wks. | Orig. | 4 Wks. | Orig. | 4 Wks. |
| Tensile strength, lbs./sq. in. | 2,000 | 850 | 1,800 | 1,950 | 1,800 | 1,375 |
| Elongation at break | 525 | 25 | 500 | 400 | 500 | 125 |
| Melt viscosity | 0.02 | (¹) | 0.02 | 0.01 | 0.02 | 0.002 |

¹ Infusible.

*Example 3.*—A sample of polythene was milled for one hour on a small rubber mill, the rolls of which were heated to 150° C. This operation was repeated with the addition in one case of 0.1% dicresylol propane to the polythene at the start of the milling period and in the second case with the addition of .01% of diphenylol propane. Suitable samples for determining power factor were prepared from the milled material. The power factor at 3000 mc. was .00117 for polythene milled in the absence of stabilizer, .00076 when dicresylol propane was present during the one-hour milling period and .00064 when diphenylol propane had been added.

The tensile strength and elongation measurements described in Examples 2 and 3 were measured on samples 1" long and ¼" wide, and all measurements were made in triplicate or more on a Scott pendulum type tester using a stretching rate of 20 inches/min. Results of tensile strength are given in lbs./sq. in. and elongations are in per cent to break.

Tear resistances were measured on an Elmendorf type tear tester, using 1" square samples and starting the tear from the end of a ½" slot in the edge of the film. Values are expressed in units of grams to tear 2" of film 1 mil in thickness, and represent the average of duplicate or triplicate measurements.

In place of the substituted phenols of the examples there can be used bis(4-hydroxyphenyl) dimethyl methane (diphenylol propane), bis(4-hydroxy - 3 - methylphenyl) dimethyl methane (dicresylol propane), bis(4-hydroxy-3-chlorophenyl) dimethylmethane, bis(4-hydroxyphenyl) methylethylmethane, bis(4 - hydroxyphenyl) phenylmethane, bis(4-hydroxyphenyl) dipropylmethane, bis(4-hydroxy-3,5-dimethylphenyl) dimethylmethane, 4-hydroxyphenyldimethylbutylmethane, 4-hydroxyphenyltriethylmethane, 4-hydroxyphenyldimethylisoamylmethane, and the like.

Polyhydric phenols, in addition to hydroquinone, useful in the practice of this invention include catechol, resorcinol, pyrogallol (1,2,3-trihydroxybenzene), phloroglucinol (symmetrical trihydroxybenzene), p,p'-dihydroxydiphenyl and the like.

Aryl amines, in addition to those of the examples, which are useful include octyl-phenylamine, octadecylphenylamine, p,p'-diaminodiphenylmethane, triphenylamine, alpha- and beta-naphthylamines, decyl - beta - naphthylamine, dodecyl-alpha-naphthylamine, octadecyl-beta-naphthylamine, symmetrical phenyl-naphthyl-ethylene-diamine, symmetrical dinaphthylethylenediamine, diphenyl paraphenylenediamine, and the like.

Long chain aliphatic amines useful in the practice of this invention are those containing at least 8 carbon atoms. Typical members of this class of compounds include dioctylamine, octadecylamine, didodecylamine, octyldecylamine, dodecylamine, dodecyltetradecylamine, dihexadecylamine, tributylamine, and the like.

Heterocyclic compounds containing annular nitrogen include the pyridines, dipyridyl, quinoline, melamine, and nitrogen bases extractable from petroleum, those obtained from shale, or obtainable by pyrolysis of cottonseed meal. These nitrogen bases are complex mixtures of compounds and may be classified in a general way into aromatic bases, e. g., methylated quinolines and hydroaromatic bases, e. g., the pyrindacine base $C_{18}H_{25}N$.

The polymeric amino nitrogen-containing substances are derived from ammonia or from monomeric amino nitrogen-containing compounds and are characterized by being substantially insoluble in water and soluble in 2% aqueous acetic acid and/or organic solvents. The amino nitrogen can be primary, secondary or tertiary and can be part of an open chain or of a cyclic structure. These polymeric amino nitrogen-containing substances can be divided into sub-groups as follows:

(1) Resinous reaction products of phenols, aldehydes, and a material from the group consisting of ammonia, primary amines, and secondary amines.

(2) Resinous reaction products of amino alcohols and a substance from the group of acrylic and alkacrylic acids.

(3) Resinous reaction products of amino phenols with aldehydes.

(4) Resinous reaction products of alkyl ketones with formaldehyde and a substance selected from the group of ammonia, primary amines, secondary amines, and tertiary amines.

(5) Resinous reaction products of diaryl guanidines with aldehydes, especially formaldehyde.

(6) Resinous reaction products of diaryl guanidines with aldehydes, especially formaldehyde, and either a primary or a secondary amine.

(7) Resinous reaction products of aryl amines with aldehydes or ketones.

(8) Resinous reaction products of vinyl ketones with either ammonia or primary or secondary amines.

(9) Resinous reaction products of phenols, piperazine, and aldehydes, especially formaldehyde.

(10) Resinous reaction products of dimethylolurea dimethyl ether with amines.

(11) Resinous reaction products of polyvinyl chloroacetate with secondary aliphatic amines.

(12) Resinous reaction products of urea, formaldehyde, and aliphatic primary or secondary amines containing less than 5 carbon atoms.

(13) Reaction products of phenol-lignin with dimethylamine and formaldehyde.

(14) Resinous reaction products obtained by the catalytic hydrogenation, in the presence of ammonia or a primary amine, of ketone group containing resins.

Combinations of two or more of the agents can be added to the ethylene polymer, particularly when stabilization against more than one degradative agency is desired.

The agents of the invention are effective in protecting the ethylene polymers against degradation catalyzed by copper and its compounds.

Because of their excellent stability the ethylene polymers containing the agents of this invention are advantageously used as binders, coatings, and impregnating agents in the manufacture of electrical insulating materials. In sheet form the compositions of this invention can be used as condenser plate separators, as separators in storage batteries, and as separators for the layers of coils in transformers, and also as external insulation on all sorts of coils such as are used in electrical machinery, radio, telephone, telegraph, and miscellaneous electrical and electronic apparatus.

In the form of sheets the compositions of this invention are valuable as so-called slot insulation in dynamo electrical machines such as motors and generators. In dynamos the connecting coils are positioned in slots which are formed in the magnetic core and which are lined with suitable insulation. Machines of this type are improved when the coil insulations, the slot lining, or both, comprise the compositions of this invention. The connections between the coils and the so-called end-windings are preferably insulated with the compositions of this invention. The connections between the coils may be covered by a sleeve which is preferably composed of the compositions of this invention in order that the sleeve may have the desired flexibility, insulating properties, and permanence. Sheets may be punched into segments of the proper shape as spacers between commutator bars of automotive, aero and like motors and generators for direct current and for alternating frequency currents. Motors of this kind are particularly useful in devices and locations where the machines are exposed to conditions abnormally destructive to conventional insulation.

The compositions of this invention can be extruded about wire or other electrical conductors, or they can be formed into tapes or ribbons and applied about the wire or other electrical conductor.

In the above electrical use the compositions of this invention can be employed as such or they can be modified with such materials as pigments, fillers, paraffin wax, or polymeric materials such as rubber, hydrogenated rubber, polyisobutylene, polystyrene, polybutadiene, etc.

The remarkable stability against heat of the compositions of this invention renders them more suitable than unstabilized ethylene polymers for melt extrusion of films, fibers, filaments, and coatings, or for other melt manipulations. The physical properties of objects prepared from ethylene polymers by melt manipulation are influenced by the temperature used. Temperatures above 185° C. are preferred, providing that degradation of the polymer can be avoided. Unstabilized compositions suffer serious degradation at such temperatures, even when practical precautions to exclude oxygen from the polymers have been taken. However, the stabilized compositions of this invention are resistant to degradation under these conditions. Such films are useful as unsupported films or in coatings or laminations, while the fibers or filaments can be knitted or woven into valuable fabrics, tubings, etc.

We claim:

1. A composition of matter comprising a normally solid ethylene homopolymer and from 0.01 to 5 parts by weight of a compound selected from the group consisting of diphenylol propane and dicresylol propane.

2. A composition of matter comprising a normally solid ethylene homopolymer and 0.1% by weight of dicresylol propane based on the ethylene polymer.

3. A composition of matter comprising a normally solid ethylene homopolymer and 0.1% by weight of diphenylol propane based on the ethylene polymer.

4. A composition of matter comprising a normally solid ethylene homopolymer and from 0.01 to 5 parts by weight of diphenylol propane per 100 parts of polymer.

5. A composition of matter comprising a normally solid ethylene homopolymer and from 0.01 to 5 parts by weight of dicresylol propane per 100 parts of polymer.

GEORGE H. LATHAM.
DANIEL E. STRAIN.

REFERENCES CITED

The following references are of record in the file of this patent:

UNITED STATES PATENTS

| Number | Name | Date |
| --- | --- | --- |
| 2,270,959 | Murke | Jan. 27, 1942 |
| 2,334,195 | Hopff | Nov. 16, 1943 |
| 2,336,195 | Sparks | Dec. 7, 1943 |

OTHER REFERENCES

Swallow, Endeavour, vol. 3, pages 26–31 (Jan. 1944).